United States Patent
Sarkis et al.

(10) Patent No.: US 11,576,156 B2
(45) Date of Patent: Feb. 7, 2023

(54) TECHNIQUES FOR RELAYING RESOURCE RESERVATION INFORMATION ON A SIDELINK

(71) Applicant: QUALCOMM Incorporated, San Diego, CA (US)

(72) Inventors: Gabi Sarkis, San Diego, CA (US); Kapil Gulati, Hillsborough, NJ (US); Tien Viet Nguyen, Bridgewater, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/800,856

(22) Filed: Feb. 25, 2020

(65) Prior Publication Data
US 2021/0266885 A1 Aug. 26, 2021

(51) Int. Cl.
H04W 72/04 (2009.01)
H04B 17/318 (2015.01)

(52) U.S. Cl.
CPC ...... *H04W 72/0406* (2013.01); *H04B 17/318* (2015.01)

(58) Field of Classification Search
CPC .................................................. H04W 72/04
See application file for complete search history.

(56) References Cited

U.S. PATENT DOCUMENTS

| | | | |
|---|---|---|---|
| 2016/0262118 A1* | 9/2016 | Kim | H04W 52/365 |
| 2017/0238304 A1* | 8/2017 | Ling | H04L 5/0037 |
| | | | 370/336 |
| 2019/0182890 A1 | 6/2019 | Jeong et al. | |
| 2019/0254059 A1 | 8/2019 | Gulati et al. | |
| 2019/0364554 A1 | 11/2019 | Kuang et al. | |
| 2019/0394786 A1 | 12/2019 | Parron et al. | |
| 2020/0236655 A1* | 7/2020 | Bharadwaj | H04L 5/0051 |

(Continued)

FOREIGN PATENT DOCUMENTS

| WO | 2019157739 A1 | 8/2019 |
|---|---|---|
| WO | WO-2020025147 A1 | 2/2020 |

OTHER PUBLICATIONS

3GPP, TSG,RAN,NR,RRC, 3GPP TS 38.331 V15.4.0, Jan. 14, 2019, 474 pages.*

(Continued)

*Primary Examiner* — Dang T Ton
(74) *Attorney, Agent, or Firm* — Dalei Dong; Harrity & Harrity, LLP

(57) ABSTRACT

Various aspects of the present disclosure generally relate to wireless communication. In some aspects, a first wireless communication device may receive, on a sidelink and from a second wireless communication device, resource reservation information associated with the second wireless communication device. The resource reservation information may identify sidelink resources that are reserved for the second wireless communication device for transmission on the sidelink. The first wireless communication device may transmit, on the sidelink, the resource reservation information to a third wireless communication device. Numerous other aspects are provided.

33 Claims, 7 Drawing Sheets

(56) References Cited

U.S. PATENT DOCUMENTS

2021/0176669 A1 6/2021 Fakoorian et al.
2021/0195577 A1* 6/2021 Wu .................. H04W 72/02

OTHER PUBLICATIONS

Interdigital Inc: "NR Sidelink Resource Allocation Mechanism for Mode 2", 3GPP Draft, 3GPP TSG RAN WG1 #97, R1-1907094 NR Sidelink Resource Allocation Mechanism for Mode 2_FINAL, 3rd Generation Partnership Project (3GPP), Mobile Competence Centre, 650, Route Des Lucioles, F-06921 Sophia-Antipolis vol. RAN WG1, No. Reno, USA, May 13, 2019-May 17, 2019, May 13, 2019 (May 13, 2019), XP051728540, 6 pages, Retrieved from the Internet: URL: http://www.3gpp.org/ftp/Meetings%5F3GPP%5FSYNC/RAN1/Docs/R1%2D1907094%2Ezip, [retrieved on May 13, 2019], Reservation based scheme, p. 3, paragraph 2.3.1-p. 4, Section 1-3.

International Search Report and Written Opinion—PCT/US2021/015319—ISA/EPO—dated May 25, 2021.

Kyocera: "Sidelink Physical Layer Structure", 3GPP Draft, 3GPP TSG-RAN WG1#98, R1-1909015, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 15, 2019 (Aug. 15, 2019), pp. 1-7, XP051765619, Retrieved from the Internet: URL: http://www.3gpp.org/ftp/tsg_ran/WG1_RL1/TSGR1_98/Docs/R1-909015.zip. [retrieved on Aug. 15, 2019] the whole document.

Sequans Communications: "On NR Sidelink Physical Layer Structure", 3GPP TSG RAN WG1 Meeting #99, R1 -1913010, Nov. 22, 2019 (Nov. 22, 2019), 8 Pages, XP051820261, Retrieved from the Internet: URL: https://ftp.3gpp.org/tsg_ran/WG1_RL1/TSGR1_99/Docs/R1-1913010.zip. R1-1913010—Structure.doc [retrieved on Nov. 8, 2019] the whole document.

\* cited by examiner

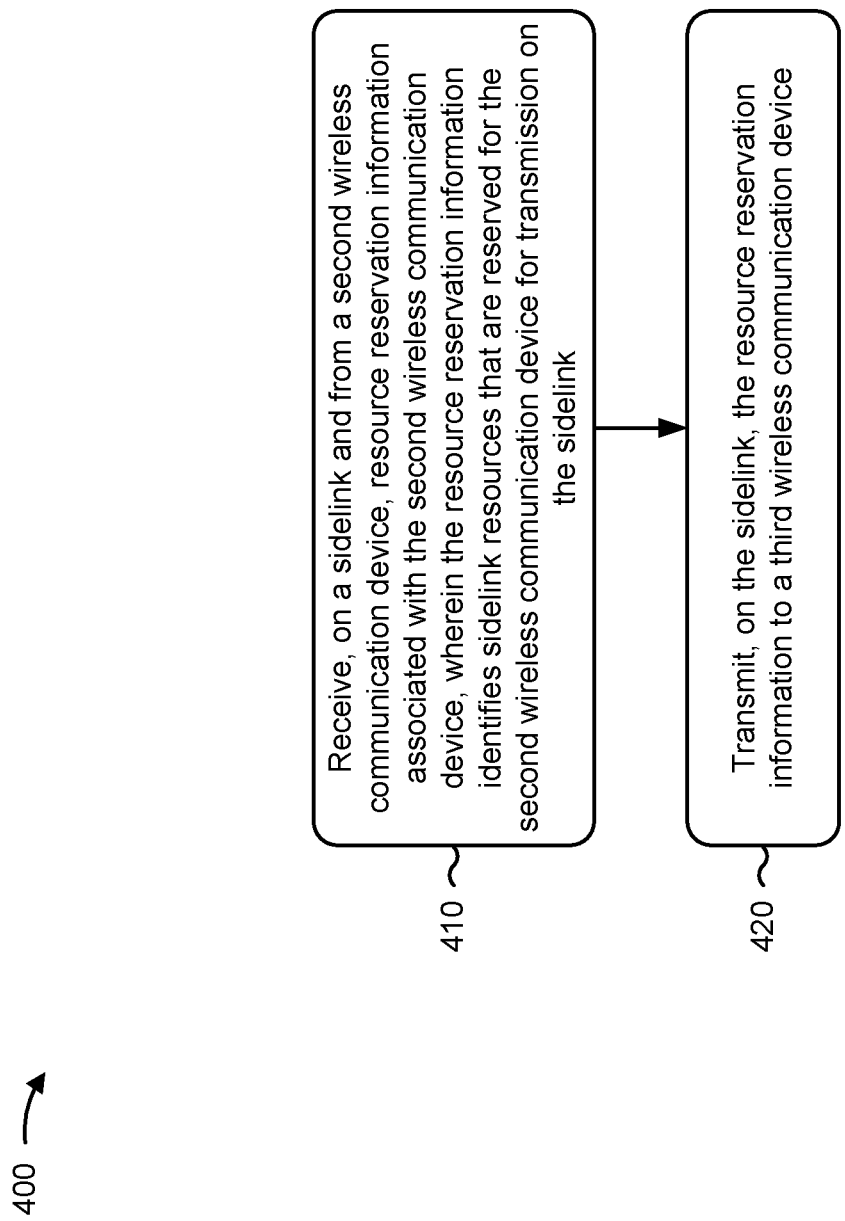

TECHNIQUES FOR RELAYING RESOURCE RESERVATION INFORMATION ON A SIDELINK

FIELD OF THE DISCLOSURE

Aspects of the present disclosure generally relate to wireless communication and to techniques and apparatuses for techniques for relaying resource reservation information on a sidelink.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first wireless communication device, may include receiving, on a sidelink and from a second wireless communication device, resource reservation information associated with the second wireless communication device, wherein the resource reservation information identifies sidelink resources that are reserved for the second wireless communication device for transmission on the sidelink, and transmitting, on the sidelink, the resource reservation information to a third wireless communication device.

In a first aspect, transmitting the resource reservation information to the third wireless communication device comprises transmitting the resource reservation information along with other resource reservation information associated with the first wireless communication device. In a second aspect, alone or in combination with the first aspect, transmitting the resource reservation information to the third wireless communication device comprises transmitting the resource reservation information in part two of a two-part sidelink control information communication on a physical sidelink shared channel.

In a third aspect, alone or in combination with one or more of the first and second aspects, transmitting the resource reservation information to the third wireless communication device comprises transmitting the resource reservation information in a medium access control control element communication along other shared data on a physical sidelink shared channel. In a fourth aspect, alone or in combination with one or more of the first through third aspects, transmitting the resource reservation information to the third wireless communication device comprises transmitting the resource reservation information in a medium access control control element communication on a physical sidelink shared channel, without other shared channel data.

In a fifth aspect, alone or in combination with one or more of the first through fourth aspects, transmitting the resource reservation information to the third wireless communication device comprises transmitting the resource reservation information in part one of a two-part sidelink control information communication on a physical sidelink control channel. In a sixth aspect, alone or in combination with one or more of the first through fifth aspects, the resource reservation information comprises at least one of an indication of one or more frequency domain resources for transmission on the sidelink by the second wireless communication device, an indication of one or more time domain resources for transmission on the sidelink by the second wireless communication device, a source identifier associated with the second wireless communication device, a destination identifier associated with a destination wireless communication device for one or more sidelink communications to be transmitted on the sidelink by the second wireless communication device, a hybrid automatic repeat request identifier for the one or more sidelink communications, a zone identifier associated with the second wireless communication device, a zone identifier associated with the first wireless communication device, or a reference signal received power measurement for the second wireless communication device and generated by the first wireless communication device.

In a seventh aspect, alone or in combination with one or more of the first through sixth aspects, the method includes receiving, on the sidelink and from one or more fourth wireless communication devices, other resource reservation information associated with the one or more fourth wireless communication devices; and transmitting the resource reservation information to the third wireless communication device comprises transmitting the resource reservation information along with the other resource reservation information to the third wireless communication device. In an eighth aspect, alone or in combination with one or more of the first through seventh aspects, transmitting the resource reservation information to the third wireless communication device comprises transmitting the resource reservation information to the third wireless communication device and to one or more fourth wireless communication devices.

In a ninth aspect, alone or in combination with one or more of the first through eighth aspects, the sidelink resources are autonomously reserved by the second wireless communication device. In a tenth aspect, alone or in combination with one or more of the first through ninth aspects, the sidelink resources are allocated to the second wireless communication device by a base station. In an eleventh aspect, alone or in combination with one or more of the first through tenth aspects, each of the first wireless communication device, the second wireless communication device, and the third wireless communication device is a user equipment or a road-side unit.

In some aspects, a first wireless communication device for wireless communication may include a memory and one or more processors operatively coupled to the memory. The memory and the one or more processors may be configured to receive, on a sidelink and from a second wireless communication device, resource reservation information associated with the second wireless communication device, wherein the resource reservation information identifies sidelink resources that are reserved for the second wireless communication device for transmission on the sidelink, and transmit, on the sidelink, the resource reservation information to a third wireless communication device.

In a first aspect, the one or more processors, when the one or more processors, when transmitting the resource reservation information to the third wireless communication device, are configured to transmit the resource reservation information along with other resource reservation information associated with the first wireless communication device. In a second aspect, alone or in combination with the first aspect, the one or more processors, when transmitting the resource reservation information to the third wireless communication device, are configured to transmit the resource reservation information in part two of a two-part sidelink control information communication on a physical sidelink shared channel.

In a third aspect, alone or in combination with one or more of the first and second aspects, the one or more processors, when transmitting the resource reservation information to the third wireless communication device, are configured to transmit the resource reservation information in a medium access control control element communication along other shared data on a physical sidelink shared channel. In a fourth aspect, alone or in combination with one or more of the first through third aspects, the one or more processors, when transmitting the resource reservation information to the third wireless communication device, are configured to transmit the resource reservation information in a medium access control control element communication on a physical sidelink shared channel, without other shared channel data.

In a fifth aspect, alone or in combination with one or more of the first through fourth aspects, the one or more processors, when transmitting the resource reservation information to the third wireless communication device, are configured to transmit the resource reservation information in part one of a two-part sidelink control information communication on a physical sidelink control channel. In a sixth aspect, alone or in combination with one or more of the first through fifth aspects, the resource reservation information comprises at least one of an indication of one or more frequency domain resources for transmission on the sidelink by the second wireless communication device, an indication of one or more time domain resources for transmission on the sidelink by the second wireless communication device, a source identifier associated with the second wireless communication device, a destination identifier associated with a destination wireless communication device for one or more sidelink communications to be transmitted on the sidelink by the second wireless communication device, a hybrid automatic repeat request identifier for the one or more sidelink communications, a zone identifier associated with the second wireless communication device, a zone identifier associated with the first wireless communication device, or a reference signal received power measurement for the second wireless communication device and generated by the first wireless communication device.

In a seventh aspect, alone or in combination with one or more of the first through sixth aspects, the one or more processors are further configured to receive, on the sidelink and from one or more fourth wireless communication devices, other resource reservation information associated with the one or more fourth wireless communication devices; and the one or more processors, when transmitting the resource reservation information to the third wireless communication device, are configured to transmit the resource reservation information along with the other resource reservation information to the third wireless communication device. In an eighth aspect, alone or in combination with one or more of the first through seventh aspects, the one or more processors, when transmitting the resource reservation information to the third wireless communication device, are configured to transmit the resource reservation information to the third wireless communication device and to one or more fourth wireless communication devices.

In a ninth aspect, alone or in combination with one or more of the first through eighth aspects, the sidelink resources are autonomously reserved by the second wireless communication device. In a tenth aspect, alone or in combination with one or more of the first through ninth aspects, the sidelink resources are allocated to the second wireless communication device by a base station. In an eleventh aspect, alone or in combination with one or more of the first through tenth aspects, each of the first wireless communication device, the second wireless communication device, and the third wireless communication device is a user equipment or a road-side unit.

In some aspects, a non-transitory computer-readable medium may store one or more instructions for wireless communication. The one or more instructions, when executed by one or more processors of a first wireless communication device, may cause the one or more processors to receive, on a sidelink and from a second wireless communication device, resource reservation information associated with the second wireless communication device, wherein the resource reservation information identifies sidelink resources that are reserved for the second wireless communication device for transmission on the sidelink, and transmit, on the sidelink, the resource reservation information to a third wireless communication device.

In a first aspect, the one or more instructions, that cause the one or more processors to transmit the resource reservation information to the third wireless communication device, cause the one or more processors to transmit the resource reservation information along with other resource reservation information associated with the first wireless communication device. In a second aspect, alone or in combination with the first aspect, the one or more instructions, that cause the one or more processors to transmit the resource reservation information to the third wireless communication device, cause the one or more processors to transmit the resource reservation information in part two of a two-part sidelink control information communication on a physical sidelink shared channel.

In a third aspect, alone or in combination with one or more of the first and second aspects, the one or more instructions, that cause the one or more processors to transmit the resource reservation information to the third wireless communication device, cause the one or more processors to transmit the resource reservation information in a medium access control control element communication along other shared data on a physical sidelink shared channel. In a fourth aspect, alone or in combination with one or more of the first through third aspects, the one or more instructions, that cause the one or more processors to transmit the resource reservation information to the third wireless communication device, cause the one or more processors to transmit the resource reservation information in a medium access control control element communication on a physical sidelink shared channel, without other shared channel data.

In a fifth aspect, alone or in combination with one or more of the first through fourth aspects, the one or more instructions, that cause the one or more processors to transmit the resource reservation information to the third wireless communication device, cause the one or more processors to transmit the resource reservation information in part one of a two-part sidelink control information communication on a physical sidelink control channel. In a sixth aspect, alone or in combination with one or more of the first through fifth aspects, the resource reservation information comprises at least one of an indication of one or more frequency domain resources for transmission on the sidelink by the second wireless communication device, an indication of one or more time domain resources for transmission on the sidelink by the second wireless communication device, a source identifier associated with the second wireless communication device, a destination identifier associated with a destination wireless communication device for one or more sidelink communications to be transmitted on the sidelink by the second wireless communication device, a hybrid automatic repeat request identifier for the one or more sidelink communications, a zone identifier associated with the second wireless communication device, a zone identifier associated with the first wireless communication device, or a reference signal received power measurement for the second wireless communication device and generated by the first wireless communication device.

In a seventh aspect, alone or in combination with one or more of the first through sixth aspects, the one or more instructions, when executed by the one or more processors, further cause the one or more processors to receive, on the sidelink and from one or more fourth wireless communication devices, other resource reservation information associated with the one or more fourth wireless communication devices; and the one or more instructions, that cause the one or more processors to transmit the resource reservation information to the third wireless communication device, are configured to transmit the resource reservation information along with the other resource reservation information to the third wireless communication device. In an eighth aspect, alone or in combination with one or more of the first through seventh aspects, the one or more instructions, that cause the one or more processors to transmit the resource reservation information to the third wireless communication device, cause the one or more processors to transmit the resource reservation information to the third wireless communication device and to one or more fourth wireless communication devices.

In a ninth aspect, alone or in combination with one or more of the first through eighth aspects, the sidelink resources are autonomously reserved by the second wireless communication device. In a tenth aspect, alone or in combination with one or more of the first through ninth aspects, the sidelink resources are allocated to the second wireless communication device by a base station. In an eleventh aspect, alone or in combination with one or more of the first through tenth aspects, each of the first wireless communication device, the second wireless communication device, and the third wireless communication device is a user equipment or a road-side unit.

In some aspects, a first apparatus for wireless communication may include means for receiving, on a sidelink and from a second apparatus, resource reservation information associated with the second apparatus, wherein the resource reservation information identifies sidelink resources that are reserved for the second apparatus for transmission on the sidelink, and means for transmitting, on the sidelink, the resource reservation information to a third apparatus.

In a first aspect, the means for transmitting the resource reservation information to the third wireless communication device comprises means for transmitting the resource reservation information along with other resource reservation information associated with the first wireless communication device. In a second aspect, alone or in combination with the first aspect, the means for transmitting the resource reservation information to the third wireless communication device comprises means for transmitting the resource reservation information in part two of a two-part sidelink control information communication on a physical sidelink shared channel.

In a third aspect, alone or in combination with one or more of the first and second aspects, the means for transmitting the resource reservation information to the third wireless communication device comprises means for transmitting the resource reservation information in a medium access control control element communication along other shared data on a physical sidelink shared channel. In a fourth aspect, alone or in combination with one or more of the first through third aspects, the means for transmitting the resource reservation information to the third wireless communication device comprises means for transmitting the resource reservation information in a medium access control control element communication on a physical sidelink shared channel, without other shared channel data.

In a fifth aspect, alone or in combination with one or more of the first through fourth aspects, the means for transmitting the resource reservation information to the third wireless communication device comprises means for transmitting the resource reservation information in part one of a two-part sidelink control information communication on a physical sidelink control channel. In a sixth aspect, alone or in combination with one or more of the first through fifth aspects, the resource reservation information comprises at least one of an indication of one or more frequency domain resources for transmission on the sidelink by the second wireless communication device, an indication of one or more time domain resources for transmission on the sidelink by the second wireless communication device, a source identifier associated with the second wireless communication device, a destination identifier associated with a destination wireless communication device for one or more sidelink communications to be transmitted on the sidelink by the second wireless communication device, a hybrid automatic repeat request identifier for the one or more sidelink communications, a zone identifier associated with the second wireless communication device, a zone identifier associated with the first wireless communication device, or a reference signal received power measurement for the second wireless communication device and generated by the first wireless communication device.

In a seventh aspect, alone or in combination with one or more of the first through sixth aspects, the apparatus includes means for receiving, on the sidelink and from one or more fourth wireless communication devices, other resource reservation information associated with the one or more fourth wireless communication devices; and the means for transmitting the resource reservation information to the third wireless communication device comprises means for transmitting the resource reservation information along with the other resource reservation information to the third wireless communication device. In an eighth aspect, alone or in combination with one or more of the first through seventh aspects, the means for transmitting the resource reservation information to the third wireless communication device comprises means for transmitting the resource reservation information to the third wireless communication device and to one or more fourth wireless communication devices.

In a ninth aspect, alone or in combination with one or more of the first through eighth aspects, the sidelink resources are autonomously reserved by the second wireless communication device. In a tenth aspect, alone or in combination with one or more of the first through ninth aspects, the sidelink resources are allocated to the second wireless communication device by a base station. In an eleventh aspect, alone or in combination with one or more of the first through tenth aspects, each of the first wireless communication device, the second wireless communication device, and the third wireless communication device is a user equipment or a road-side unit.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a wireless communication device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
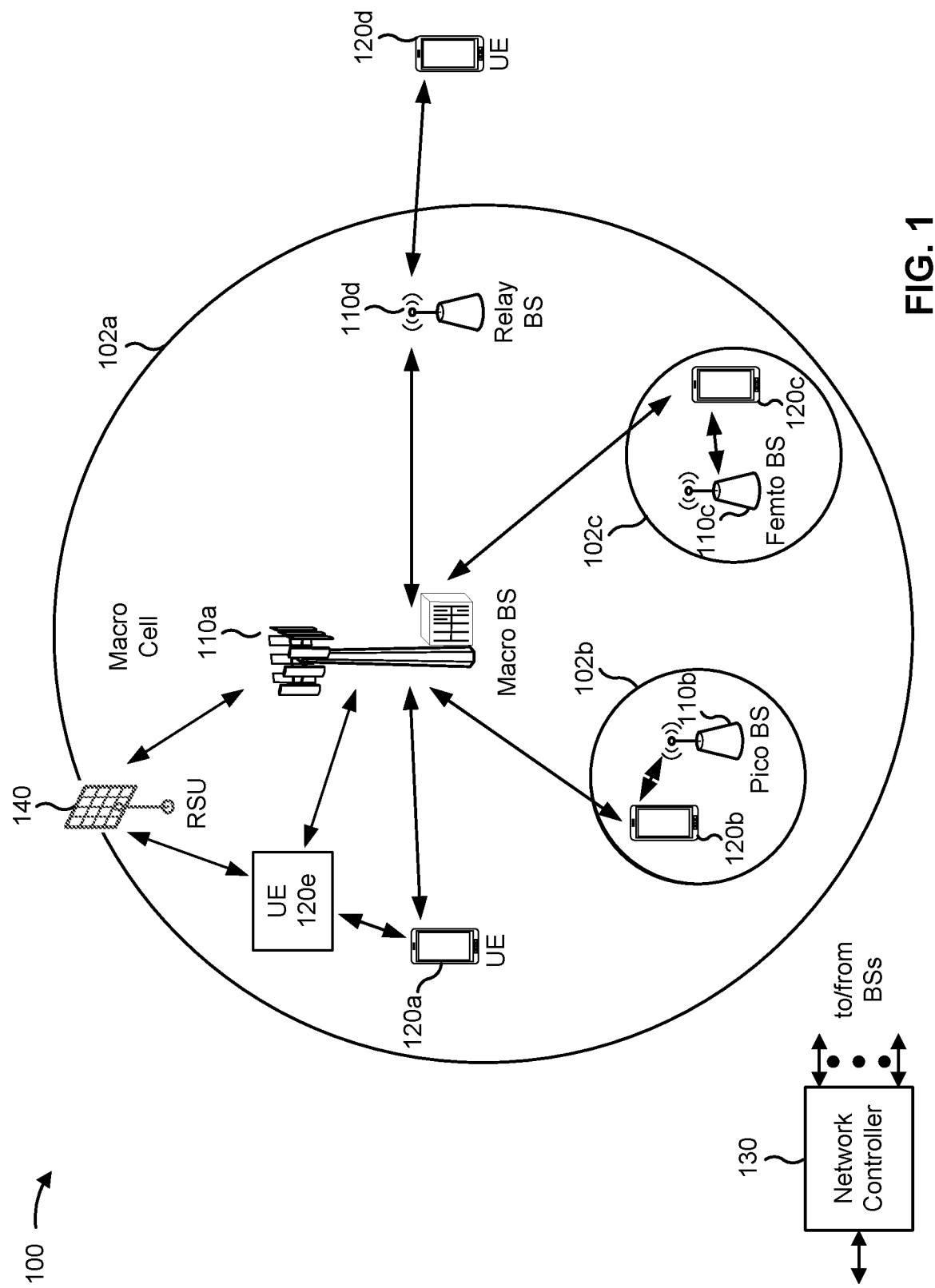
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

Wireless network 100 may include one or more roadside units (RSUs) 140 that may communicate with UEs 120 and BSs 110 in the wireless network 100. An RSU 140 may be a wireless communication device that communicates directly with UEs 120 and/or other RSUs 140 in a V2X environment. An RSU 140 may be positioned near a road, such as on a traffic light, on a lamp pole, on an overpass, and/or on other structures near the road. An RSU 140 may receive data, control information, safety alerts, and/or other types of information and may forward, relay, and/or otherwise transmit these types of information to other entities in the wireless network 100 (and/or outside of wireless network 100). For example, an RSU 140 may provide basic safety alert messages to UEs 120, may receive and forward positioning information associated with UEs 120, and/or the like. In these environments, a UE 120 may be a V2X enabled vehicle, may be deployed and associated with a vehicle or pedestrian, and/or the like.

In some aspects, two or more UEs 120 (e.g., shown as UE 120a and UE 120e), two or more RSUs 140, and/or a UE 120 and an RSU 140 may communicate directly using one or more sidelink channels (e.g., without using a base station 110 as an intermediary to communicate with one another). For example, the UEs 120 and the RSUs 140 may communicate using peer-to-peer (P2P) communications, device-to-device (D2D) communications, a V2X protocol (e.g., which may include a vehicle-to-vehicle (V2V) protocol, a vehicle-to-infrastructure (V2I) protocol, and/or the like), a mesh network, and/or the like. In this case, some of the UEs 120 and RSUs 140 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2A:
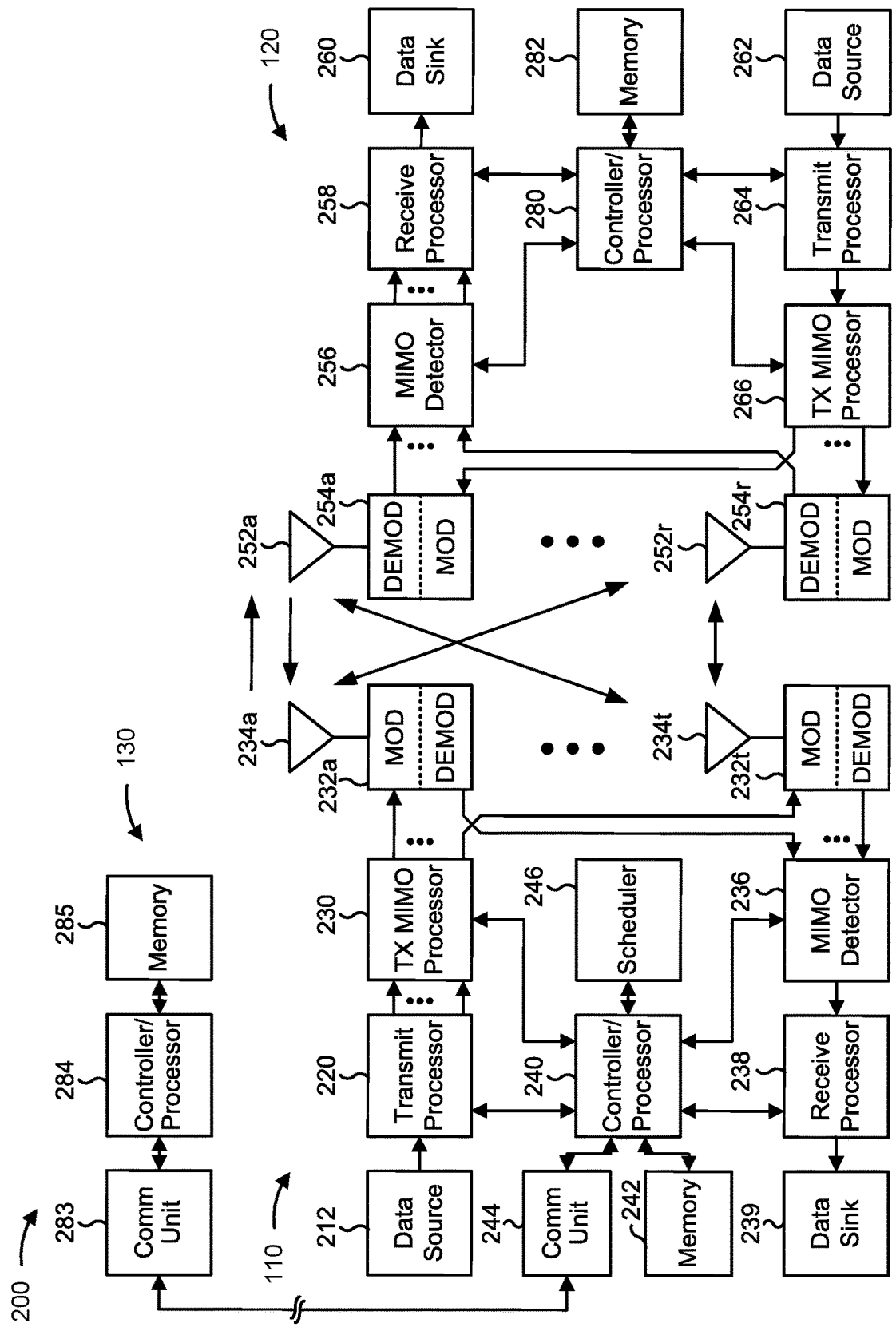
FIGS. 2A and 2B are diagrams illustrating an example of a base station, a user equipment, and a roadside unit in communication in a wireless network, in accordance with various aspects of the present disclosure.
Figure 2B:
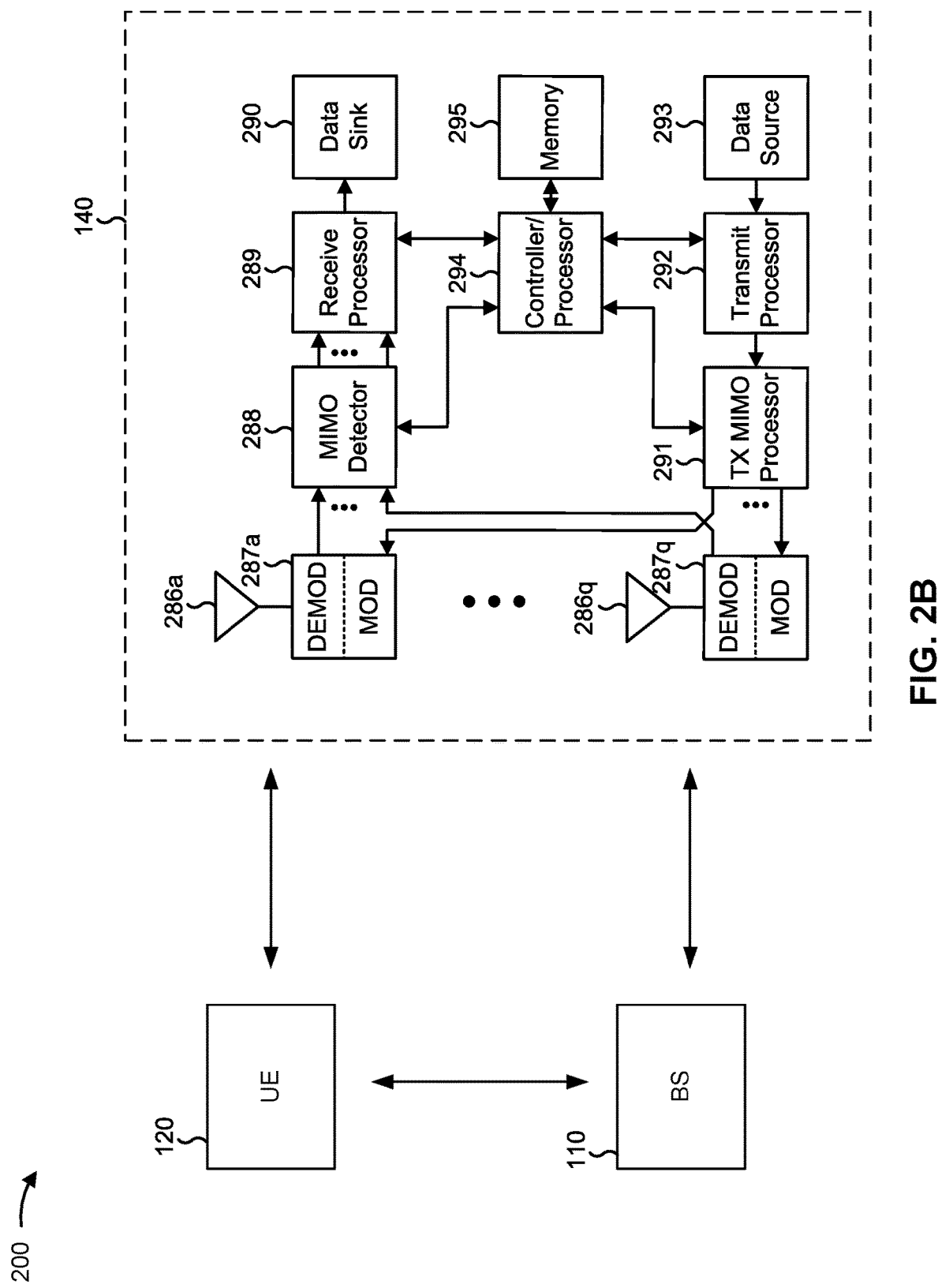

FIGS. 2A and 2B show block diagrams of a design 200 of base station 110, a UE 120, and an RSU 140, which may be one of the base stations, one of the UEs, and the RSU in FIG. 1. Base station 110 may be equipped with T antennas 234a through 234t, UE 120 may be equipped with R antennas 252a through 252r, and RSU 140 may be equipped with Q antennas 252a through 252q, where in general T≥1, Q≥1, and R≥1.

As shown in FIG. 2A, at base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may receive data from a data source 212 for one or more RSUs, select one or more MCSs for each RSUs based at least in part on CQIs received from the RSUs, process (e.g., encode and modulate) the data for each RSUs based at least in part on the MCS(s) selected for the RSUs, and provide data symbols for all RSUs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

As shown in FIG. 2A, at UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 283, controller/processor 284, and memory 285.

On a sidelink, antennas 252a through 252r may receive sidelink signals from other UEs 120 and/or from RSU 140 and may provide received signals to DEMODs 254a through 254r, respectively. Each demodulator 254 may condition a received signal to obtain input samples. Each demodulator 254 may further process the input samples to obtain received symbols. A MIMO detector 256 may obtain received symbols from all R demodulators 254a through 254r, perform MIMO detection on the received symbols if applicable, and provide detected symbols. A receive processor 258 may process the detected symbols, provide decoded data for UE 120 to a data sink 260, and provide decoded control information and system information to a controller/processor 280. A channel processor may an RSRP, an RSSI, an RSRP, a CQI, and/or the like for the sidelink. Transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to other UEs 120 and/or to RSU 140 on the sidelink.

As shown in FIG. 2B, at RSU 140, antennas 286a through 286q may receive the downlink signals from base station 110 and/or other base stations and may provide received signals to DEMODs 287a through 287q, respectively. Each demodulator 287 may condition (e.g., filter, amplify, downconvert, and digitize) a received signal to obtain input samples. Each demodulator 287 may further process the input samples (e.g., for OFDM and/or the like) to obtain received symbols. A MIMO detector 288 may obtain received symbols from all Q demodulators 287a through 287q, perform MIMO detection on the received symbols if applicable, and provide detected symbols. A receive processor 289 may process (e.g., demodulate and decode) the detected symbols, provide decoded data for RSU 140 to a data sink 290, and provide decoded control information and system information to a controller/processor 294. A channel processor may determine an RSRP, an RSSI, an RSRQ, a CQI, and/or the like. In some aspects, one or more components of RSU 140 may be included in a housing.

On the uplink, at RSU 140, a transmit processor 292 may receive and process data from a data source 293 and control information (e.g., for reports comprising RSRP, RSSI, RSRQ, CQI, and/or the like) from controller/processor 294. Transmit processor 292 may also generate reference symbols for one or more reference signals. The symbols from transmit processor 292 may be precoded by a TX MIMO processor 291 if applicable, further processed by modulators 287a through 287q (e.g., for DFT-s-OFDM, CP-OFDM, and/or the like), and transmitted to base station 110. At base station 110, the uplink signals from RSU 140 and other RSUs may be received by antennas 234, processed by demodulators 232, detected by a MIMO detector 236 if applicable, and further processed by a receive processor 238 to obtain decoded data and control information sent by RSU 140. Receive processor 238 may provide the decoded data to a data sink 239 and the decoded control information to controller/processor 240. Base station 110 may include communication unit 244 and communicate to network controller 130 via communication unit 244. Network controller 130 may include communication unit 283, controller/processor 284, and memory 285.

On a sidelink, antennas 286a through 286q may receive sidelink signals from UEs 120 and/or from other RSUs 140 and may provide received signals to DEMODs 287a through 287q, respectively. Each demodulator 287 may condition a received signal to obtain input samples. Each demodulator 287 may further process the input samples to obtain received symbols. A MIMO detector 288 may obtain received symbols from all Q demodulators 287a through 287r, perform MIMO detection on the received symbols if applicable, and provide detected symbols. A receive processor 289 may process the detected symbols, provide decoded data for RSU 140 to a data sink 29, and provide decoded control information and system information to a controller/processor 2974. A channel processor may an RSRP, an RSSI, an RSRP, a CQI, and/or the like for the sidelink. Transmit processor 292 may receive and process data from a data source 293 and control information (e.g., for reports comprising RSRP, RSSI, RSRQ, CQI, and/or the like) from controller/processor 294. Transmit processor 292 may also generate reference symbols for one or more reference signals. The symbols from transmit processor 292 may be precoded by TX MIMO processor 2291 if applicable, further processed by modulators 287a through 287q (e.g., for DFT-s-OFDM, CP-OFDM, and/or the like), and transmitted to UEs 120 and/or to other RSUs 140 on the sidelink.

Controller/processor 240 of base station 110, controller/processor 280 of UE 120, controller/processor 294 of RSU 140, and/or any other component(s) of FIGS. 2A and/or 2B may perform one or more techniques associated with relaying resource reservation information on a sidelink, as described in more detail elsewhere herein. For example, controller/processor 240 of base station 110, controller/processor 280 of UE 120, controller/processor 294 of RSU 140, and/or any other component(s) of FIGS. 2A and/or 2B may perform or direct operations of, for example, process 400 of FIG. 4 and/or other processes as described herein. Memories 242, 282, and 295 may store data and program codes for base station 110, UE 120, and RSU 140, respectively. In some aspects, memory 242, memory 282, and/or memory 294 may comprise a non-transitory computer-readable medium storing one or more instructions for wireless communication. For example, the one or more instructions, when executed by one or more processors of the base station 110, the UE 120, and/or the RSU 140 may perform or direct operations of, for example, process 400 of FIG. 4 and/or other processes as described herein. A scheduler 246 may schedule UEs and/or RSUs for data transmission on the downlink and/or uplink. In some aspects, scheduler 246 may schedule UEs and/or RSUs for data transmission on the sidelink.

In some aspects, UE 120 may include means for receiving, on a sidelink and from a second wireless communication device (e.g., a second UE 120 or an RSU 140), resource reservation information associated with the second wireless communication device, wherein the resource reservation information identifies sidelink resources that are reserved for the second wireless communication device for transmission on the sidelink, means for transmitting, on the sidelink, the resource reservation information to a third wireless communication device (e.g., a third UE 120 or another RSU 140), and/or the like. In some aspects, such means may include one or more components of UE 120 described in connection with FIG. 2A, such as controller/processor 280, transmit processor 264, TX MIMO processor 266, MOD 254, antenna 252, DEMOD 254, MIMO detector 256, receive processor 258, and/or the like.

In some aspects, RSU 140 may include means for receiving, on a sidelink and from a second wireless communication device (e.g., a UE 120 or a second RSU 140), resource reservation information associated with the second wireless communication device, wherein the resource reservation information identifies sidelink resources that are reserved for the second wireless communication device for transmission on the sidelink, means for transmitting, on the sidelink, the resource reservation information to a third wireless communication device (e.g., another UE 120 or a third RSU 140), and/or the like. In some aspects, such means may include one or more components of RSU 140 described in connection with FIG. 2B, such as controller/processor 294, transmit processor 292, TX MIMO processor 291, MOD 287, antenna 286, DEMOD 287, MIMO detector 288, receive processor 289, and/or the like.

As indicated above, FIGS. 2A and 2B are provided as an example. Other examples may differ from what is described with regard to FIGS. 2A and 2B.

In a wireless network, a wireless communication device (e.g., a UE or an RSU) may use various resource reservation techniques to reserve sidelink resources for transmission on the sidelink. For example, a BS may reserve sidelink resources for a wireless communication device and may transmit resource reservation information associated with the reserved sidelink resources to the wireless communication device. This may be referred to as an NR Mode 1 sidelink resource allocation. As another example, a wireless communication device may autonomously reserve sidelink resources without assistance from a BS. This may be referred to as an NR Mode 2 sidelink resource allocation.

To autonomously reserve sidelink resources for transmission on a sidelink, a wireless communication device may monitor for sidelink communications carrying resource reservation information associated with other wireless communication devices. The wireless communication device may determine the available sidelink resources on the sidelink based at least in part on the resource reservation information from the other wireless communication devices, and may select sidelink resources from the available sidelink resources for transmission on the sidelink.

In some cases, a wireless communication may miss or not receive resource reservation information from another wireless communication device. For example, the wireless communication device may experience interference, degraded sidelink channel conditions, a temporary blockage or obstruction, and/or the like, which may block a sidelink communication carrying the resource reservation information or may result in the sidelink communication being undecodable. As another example, the wireless communication device may operate in half-duplex, in which case the wireless communication device can either transmit or receive at a given time. As a result, the wireless communication device may not be able to receive a sidelink communication carrying resource reservation information from the other wireless communication device while the wireless communication device is transmitting.

If a wireless communication device misses or does not receive resource reservation information from another wireless communication device, the wireless communication device may attempt to reserve sidelink resources that have already been reserved by the other wireless communication device. This may cause sidelink communications from the wireless communication devices to collide on the sidelink, which may result in the sidelink communications being undecodable. As a result, these collisions increase the likelihood that sidelink communications will be dropped, which may result in increased retransmission of sidelink communications. Moreover, if sidelink communications need to be retransmitted, these sidelink communications suffer from increased latency, which can cause safety issues in some V2X safety applications.

Some aspects described herein provide techniques for relaying resource reservation information on a sidelink. In some aspects, a first wireless communication device (e.g., a UE 120 or an RSU 140) may receive, on a sidelink, resource reservation information associated with a second wireless communication device. The first wireless communication device may forward, relay, and/or otherwise transmit the reservation information to other wireless communication devices on the sidelink.

In this way, if a third wireless communication device fails to receive the resource reservation information directly from the second wireless communication device (e.g., due to interference, due to the third wireless communication device transmitting while the resource reservation information is to be received, and/or the like), the third wireless communication device may receive the resource reservation information from the first wireless communication device. This reduces and/or eliminates the likelihood that the third wireless communication device will attempt to reserve sidelink resources that have already been reserved for the second wireless communication device, which reduces and/or eliminates collisions on the sidelink, reduces the likelihood that sidelink communications will be dropped, and reduces safety issues in various V2X safety applications.

Figure 3A:
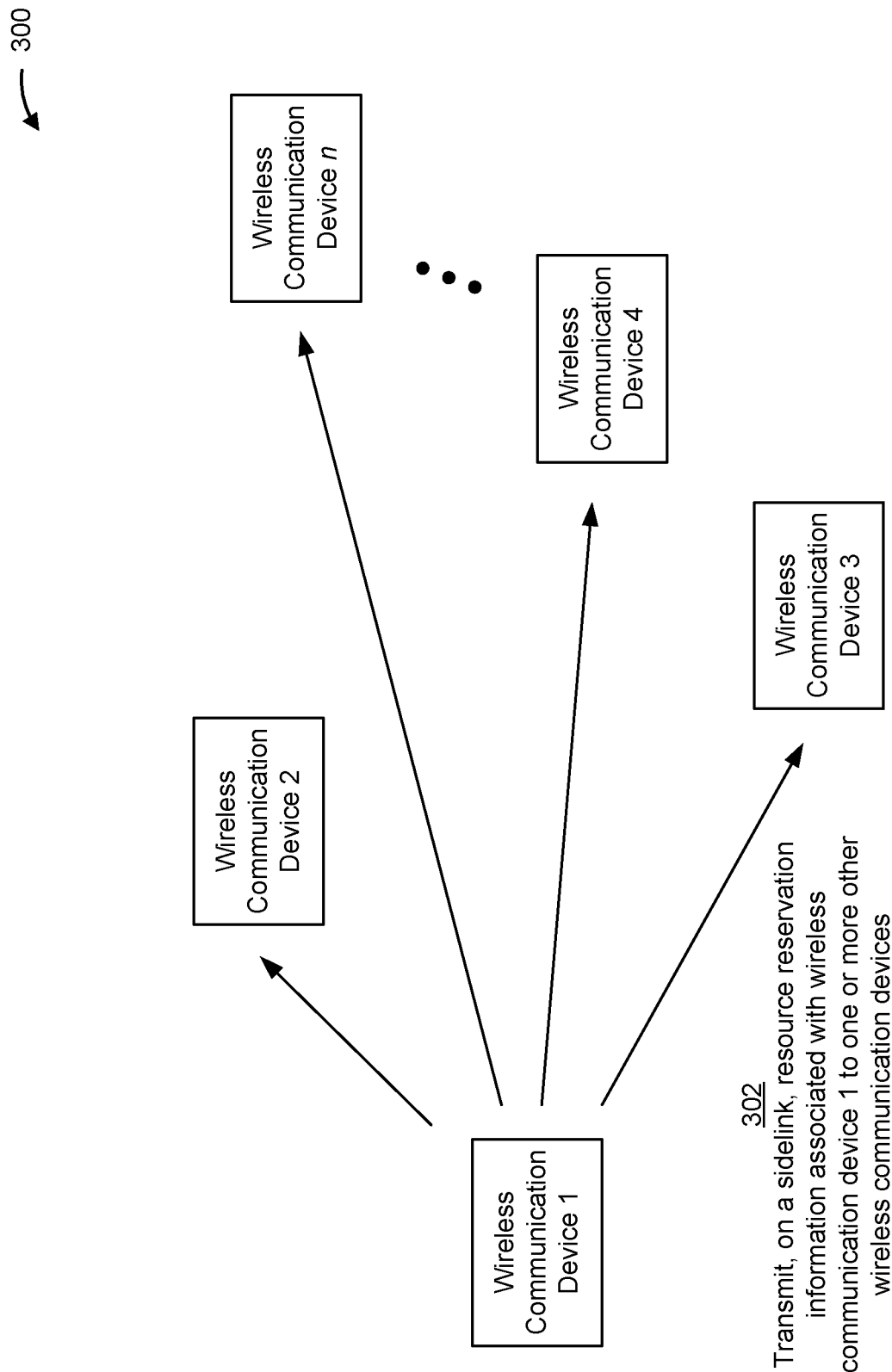
FIGS. 3A and 3B are diagrams illustrating one or more examples of relaying resource reservation information on a sidelink, in accordance with various aspects of the present disclosure.
Figure 3B:
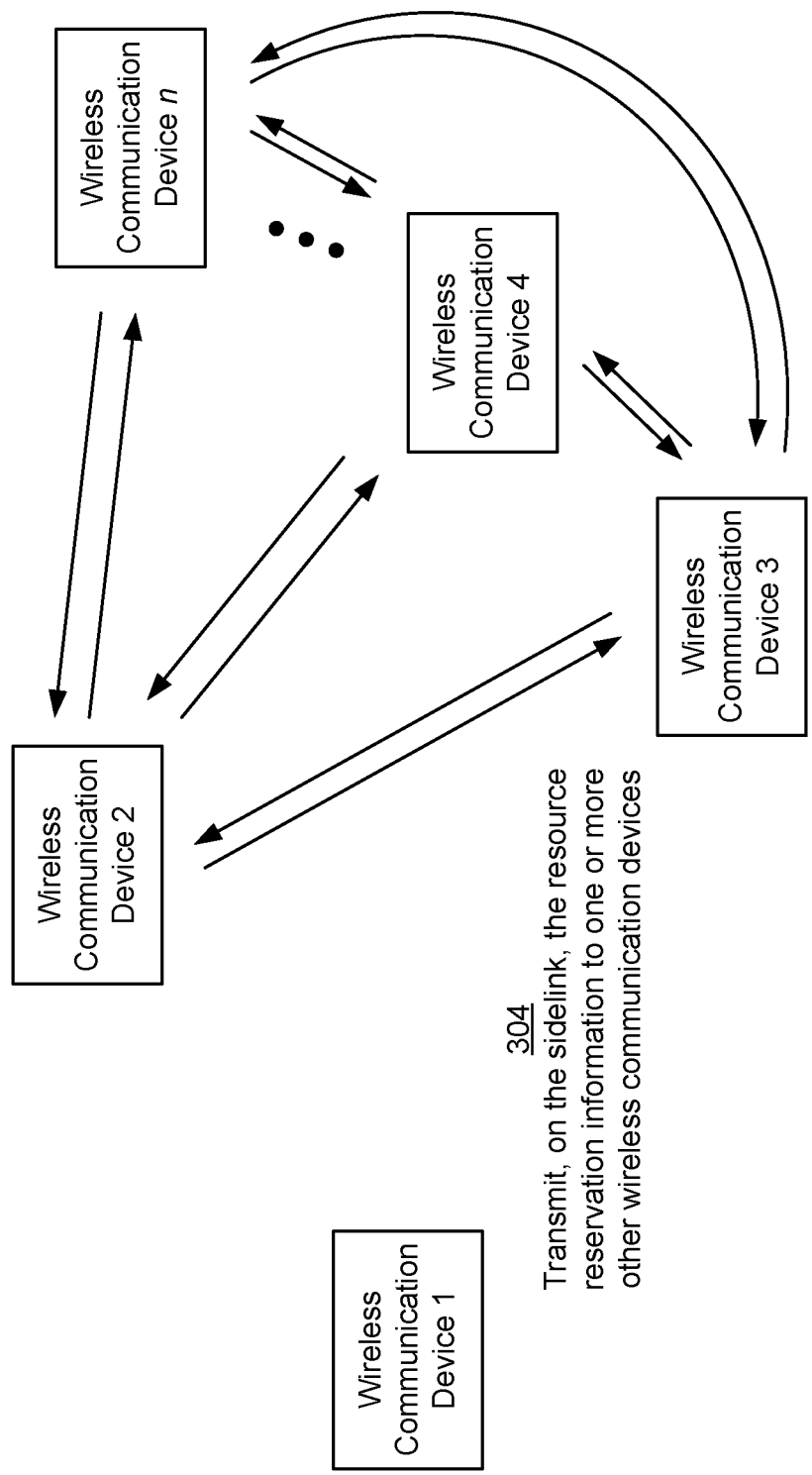

FIGS. 3A and 3B are diagrams illustrating one or more examples 300 of relaying resource reservation information on a sidelink, in accordance with various aspects of the present disclosure. As shown in FIGS. 3A and 3B, example(s) 300 include communication between a plurality of wireless communication devices (e.g., UEs 120 and/or RSUs 140). In some aspects, the wireless communications devices (e.g., wireless communication device 1 through wireless communication device n) may be included in a wireless network, such as wireless network 100. In some aspects, the wireless communication devices may communicate on a sidelink (e.g., without using a BS 110 as an intermediary to communicate with one another).

As shown in FIG. 3A, and by reference number 302, wireless communication device 1 may transmit, on the sidelink, resource reservation information associated with wireless communication device 1. In some aspects, wireless communication device 1 may transmit the resource reservation information on the sidelink to one or more other wireless communication devices, such as wireless communication device 2, wireless communication device 3, and/or the like.

In some aspects, the resource reservation information may identify one or more sidelink resources that are reserved for the wireless communication device 1 for transmission on the sidelink. For example, the resource reservation information may include an indication of one or more frequency domain resources (e.g., resource elements, resource blocks, subchannels, subcarriers, component carriers, and/or the like) for transmission on the sidelink, an indication of one or more time domain resources (e.g., one or more symbols, one or more slots, and/or the like) for transmission on the sidelink, and/or the like. In some aspects, the one or more sidelink resources may be indicated by a binary bitmap, by a list of resource reservations, and/or the like.

In some aspects, the one or more sidelink resources may be reserved via an NR Mode 1 sidelink resource allocation, where a BS 110 reserves the one or more sidelink resources for wireless communication device 1 and transmits an indication of the one or more sidelink resources in a scheduling grant to wireless communication device 1). In some aspects, the one or more sidelink resources may be reserved via an NR Mode 2 sidelink resource, where wireless communication device 1 autonomously reserves the one or more sidelink resources without assistance from a BS 110.

In some aspects, the resource reservation information may include a source identifier associated with wireless communication device 1. The source identifier may identify wireless communication device 1 as the source of one or more sidelink communications that are to be transmitted in the reserved sidelink resources. In some aspects, the resource reservation information may include a destination identifier. The destination identifier may identify a destination wireless communication device for the one or more sidelink communications.

In some aspects, the resource reservation information may include a hybrid automatic repeat request (HARQ) identifier for the one or more sidelink communications. The HARQ identifier may identify a HARQ process that is to be used for the one or more sidelink communications. In some aspects, the resource reservation information may include a zone identifier associated with wireless communication device 1. The zone identifier may identify a zone of a cell of a BS in which wireless communication device 1 is located. In some aspects, the resource reservation information may include other location information associated with wireless communication device 1.

In some aspects, wireless communication device 1 may transmit the resource reservation to the one or more other wireless communication devices on a physical sidelink control channel (PSCCH). For example, wireless communication device 1 may transmit the resource reservation in sidelink control information part one (SCI-1) on the PSCCH. The SCI-1 may be part one of a two-part SCI communication transmitted by wireless communication device 1.

As shown in FIG. 3B, and by reference number 304, the other wireless communication devices (e.g., wireless communication device 2 through wireless communication device n) may forward, relay, and/or otherwise transmit, on the sidelink, the resource reservation information, associated with wireless communication device 1, to one or more wireless communication devices. For example, wireless communication device 2 may forward, relay, and/or otherwise transmit, on the sidelink, the resource reservation information to one or more of wireless communication device 3 through wireless communication device n, wireless communication device 3 may forward, relay, and/or otherwise transmit, on the sidelink, the resource reservation information to one or more of wireless communication device 2 and/or wireless communication device 4 through wireless communication device n, and so on.

In some aspects, a wireless communication device may forward, relay, and/or otherwise transmit, on the sidelink, the resource reservation information to one or more other wireless communication devices by transmitting the resource reservation information in SCI-1 on a PSCCH. In these cases, the SCI-1 of the wireless communication device may repeat the SCI-1 received from wireless communication device 1. In some aspects, the wireless communication device may further include, in the SCI-1 of the wireless communication device, sidelink control information part two (SCI-2) of the two-part SCI associated with wireless communication device 1.

In some aspects, the SCI-1 of the wireless communication may support the inclusion of resource reservation information for a plurality of sidelink transmissions. In these cases, the wireless communication device may include, in the SCI-1 of the wireless communication device, the resource reservation information associated with wireless communication device 1 and resource reservation information associated with the wireless communication device. This permits the wireless communication device to reserve sidelink resources while forwarding, relaying, and/or otherwise transmitting the resource reservation information associated with the wireless communication device.

In some aspects, a wireless communication device may forward, relay, and/or otherwise transmit, on the sidelink, the resource reservation information to one or more other wireless communication devices by transmitting the resource reservation information in SCI-2 of a two-part SCI associated with the wireless communication device. In these cases, the wireless communication device may transmit the SCI-2 on a physical sidelink shared channel (PSSCH). In some aspects, the SCI-2 may include a new format for SCI-2 that support the inclusion of the resource reservation information in the SCI-2.

In some aspects, a wireless communication device may forward, relay, and/or otherwise transmit, on the sidelink, the resource reservation information to one or more other wireless communication devices by piggybacking the resource reservation on a data communication transmitted on a PSSCH. In these cases, the resource reservation information may be included in a medium access control control element (MAC-CE) communication on the PSSCH. In some aspects, a wireless communication device may forward, relay, and/or otherwise transmit, on the sidelink, the resource reservation information to one or more other wireless communication devices in a MAC-CE on the PSSCH without an accompanying data transmission.

In some aspects, a wireless communication device may include additional information along with the resource reservation information when forwarding, relaying, and/or otherwise transmitting resource reservation information associated with another wireless communication device. For example, if wireless communication device 2 forwards, relays, and/or otherwise transmits, on the sidelink, the resource reservation information associated with wireless communication device 1, wireless communication device 2 may further include a zone identifier and/or other location information associated with wireless communication device 2, one or more signal measurements associated with wireless communication device 1 and performed by wireless communication device 2 (e.g., an RSRP measurement, an RSSI measurement, an RSRQ measurement, a CQI measurement, and/or the like), and/or the like.

In some aspects, a wireless communication device may forward, relay, and/or otherwise transmit, on the sidelink, resource reservation information associated with a plurality of wireless communication devices in a single sidelink communication. For example, wireless communication device 2 may receive resource reservation information on the sidelink from wireless communication device 1 and wireless communication device 3, and may forward, relay, and/or otherwise transmit the receive resource reservation information on the sidelink from wireless communication device 1 and wireless communication device 3 on the sidelink in a single sidelink communication.

In some aspects, each wireless communication device (e.g., each of wireless communication device 1 through wireless communication device n) may transmit, on the sidelink, respective resource reservation on the sidelink to one or more other wireless communication devices in a similar manner as described above in connection with FIGS. 3A and 3B. Moreover, each wireless communication device (e.g., each of wireless communication device 1 through wireless communication device n) may receive, on the sidelink, resource reservation information on the sidelink from one or more other wireless communication devices, and may forward, relay, and/or otherwise transmit, on the sidelink, the received reservation information to one or more other wireless communication devices in connection with FIGS. 3A and 3B.

In this way, if a first wireless communication device fails to receive the resource reservation information directly from a second wireless communication device (e.g., due to interference, due to the wireless communication device transmitting while the resource reservation information is to be received, and/or the like), the first wireless communication device may receive the resource reservation information from a third wireless communication device. This reduces and/or eliminates the likelihood that the first wireless communication device will attempt to reserve sidelink resources that have already been reserved for the second wireless communication device, which reduces and/or eliminates collisions on the sidelink, reduces the likelihood that sidelink communications will be dropped, and reduces safety issues in various V2X safety applications.

As indicated above, FIGS. 3A and 3B is provided as one or more examples. Other examples may differ from what is described with respect to FIGS. 3A and 3B.

FIG. 4 is a diagram illustrating an example process 400 performed, for example, by a first wireless communication device, in accordance with various aspects of the present disclosure. Example process 400 is an example where the first wireless communication device (e.g., UE 120 illustrated and described above in connection with FIGS. 1 and 2, RSU 140 illustrated and described above in connection with FIGS. 1 and 2, a wireless communication device illustrated and described above in connection with FIGS. 3A and 3B, and/or the like) performs operations associated with relaying resource reservation information on a sidelink.

As shown in FIG. 4, in some aspects, process 400 may include receiving, on a sidelink and from a second wireless communication device, resource reservation information associated with the second wireless communication device, wherein the resource reservation information identifies sidelink resources that are reserved for the second wireless communication device for transmission on the sidelink (block 410). For example, the first wireless communication device (e.g., using antenna 252, antenna 286, DEMOD 254, DEMOD 287, MIMO detector 256, MIMO detector 288, receive processor 258, receive processor 289, controller/processor 280, controller/processor 294, memory 282, memory 295, and/or the like) may receive, on a sidelink and from a second wireless communication device, resource reservation information associated with the second wireless communication device, as described above. In some aspects, the resource reservation information identifies sidelink resources that are reserved for the second wireless communication device for transmission on the sidelink.

As further shown in FIG. 4, in some aspects, process 400 may include transmitting, on the sidelink, the resource reservation information to a third wireless communication device (block 420). For example, the first wireless communication device (e.g., using antenna 252, antenna 286, MOD 254, MOD 287, TX MIMO processor 266, MIMO processor 291, transmit processor 264, transmit processor 292, controller/processor 280, controller/processor 294, memory 282, memory 295, and/or the like) may transmit, on the sidelink, the resource reservation information to a third wireless communication device, as described above.

Process 400 may include additional aspects, such as any single aspect or any combination of aspects described below and/or in connection with one or more other processes described elsewhere herein.

In a first aspect, transmitting the resource reservation information to the third wireless communication device comprises transmitting the resource reservation information along with other resource reservation information associated with the first wireless communication device. In a second aspect, alone or in combination with the first aspect, transmitting the resource reservation information to the third wireless communication device comprises transmitting the resource reservation information in part two of a two-part sidelink control information communication on a physical sidelink shared channel.

In a third aspect, alone or in combination with one or more of the first and second aspects, transmitting the resource reservation information to the third wireless communication device comprises transmitting the resource reservation information in a medium access control control element communication along other shared data on a physical sidelink shared channel. In a fourth aspect, alone or in combination with one or more of the first through third aspects, transmitting the resource reservation information to the third wireless communication device comprises transmitting the resource reservation information in a medium access control control element communication on a physical sidelink shared channel, without other shared channel data.

In a fifth aspect, alone or in combination with one or more of the first through fourth aspects, transmitting the resource reservation information to the third wireless communication device comprises transmitting the resource reservation information in part one of a two-part sidelink control information communication on a physical sidelink control channel. In a sixth aspect, alone or in combination with one or more of the first through fifth aspects, the resource reservation information comprises at least one of an indication of one or more frequency domain resources for transmission on the sidelink by the second wireless communication device, an indication of one or more time domain resources for transmission on the sidelink by the second wireless communication device, a source identifier associated with the second wireless communication device, a destination identifier associated with a destination wireless communication device for one or more sidelink communications to be transmitted on the sidelink by the second wireless communication device, a hybrid automatic repeat request identifier for the one or more sidelink communications, a zone identifier associated with the second wireless communication device, a zone identifier associated with the first wireless communication device, or a reference signal received power measurement for the second wireless communication device and generated by the first wireless communication device.

In a seventh aspect, alone or in combination with one or more of the first through sixth aspects, process 400 includes receiving, on the sidelink and from one or more fourth wireless communication devices, other resource reservation information associated with the one or more fourth wireless communication devices; and transmitting the resource reservation information to the third wireless communication device comprises transmitting the resource reservation information along with the other resource reservation information to the third wireless communication device. In an eighth aspect, alone or in combination with one or more of the first through seventh aspects, transmitting the resource reservation information to the third wireless communication device comprises transmitting the resource reservation information to the third wireless communication device and to one or more fourth wireless communication devices.

In a ninth aspect, alone or in combination with one or more of the first through eighth aspects, the sidelink resources are autonomously reserved by the second wireless communication device. In a tenth aspect, alone or in combination with one or more of the first through ninth aspects, the sidelink resources are allocated to the second wireless communication device by a base station. In an eleventh aspect, alone or in combination with one or more of the first through tenth aspects, each of the first wireless communication device, the second wireless communication device, and the third wireless communication device is a user equipment or a road-side unit.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 500 is a conceptual data flow diagram 500 illustrating the data flow between different components in an example apparatus 502. The apparatus 502 may be a UE (e.g., a UE 120 illustrated and described above in connection with FIGS. 1 and 2), an RSU (e.g., an RSU 140 illustrated and described above in connection with FIGS. 1 and 2), a wireless communication device (e.g., a wireless communication device illustrated and described above in connection with FIGS. 3A and 3B), and/or the like. In some aspects, the apparatus 502 includes a reception component 504 and a transmission 506.

In some aspects, reception component 504 may receive, on a sidelink and from another apparatus 550 (e.g., a UE 120, an RSU 140, a wireless communication device, and/or the like), resource reservation information 508 associated with the apparatus 550. In some aspects, the resource reservation information 508 identifies sidelink resources that are reserved for the apparatus 550 for transmission on the sidelink. In some aspects, transmission component 506 may transmit, on the sidelink, the resource reservation information 508 to another apparatus 560 (e.g., a UE 120, an RSU 140, a wireless communication device, and/or the like).

In some aspects, the reception component 504 may include an antenna (e.g., antenna 252, antenna 286, and/or the like), a DEMOD (e.g., DEMOD 254, DEMOD 287, and/or the like), a MIMO detector (e.g., MIMO detector 256, MIMO detector 288, and/or the like), a receive processor (e.g., receive processor 258, receive processor 289, and/or the like), a controller/processor (e.g., controller/processor 280, controller/processor 294, and/or the like), a memory (e.g., memory 282, memory 295, and/or the like), and/or the like. In some aspects, the transmission component 506 may include an antenna (e.g., antenna 252, antenna 286, and/or the like), a MOD (e.g., MOD 254, MOD 287, and/or the like), a MIMO processor (e.g., TX MIMO processor 266, MIMO processor 291, and/or the like), a transmit processor (e.g., transmit processor 264, transmit processor 292, and/or the like), a controller/processor (e.g., controller/processor 280, controller/processor 294, and/or the like), a memory (e.g., memory 282, memory 295, and/or the like), and/or the like.

The apparatus 502 may include additional components that perform each of the blocks of the algorithm in the aforementioned process 400 of FIG. 400 and/or the like. Each block in the aforementioned process 400 of FIG. 400 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 5:
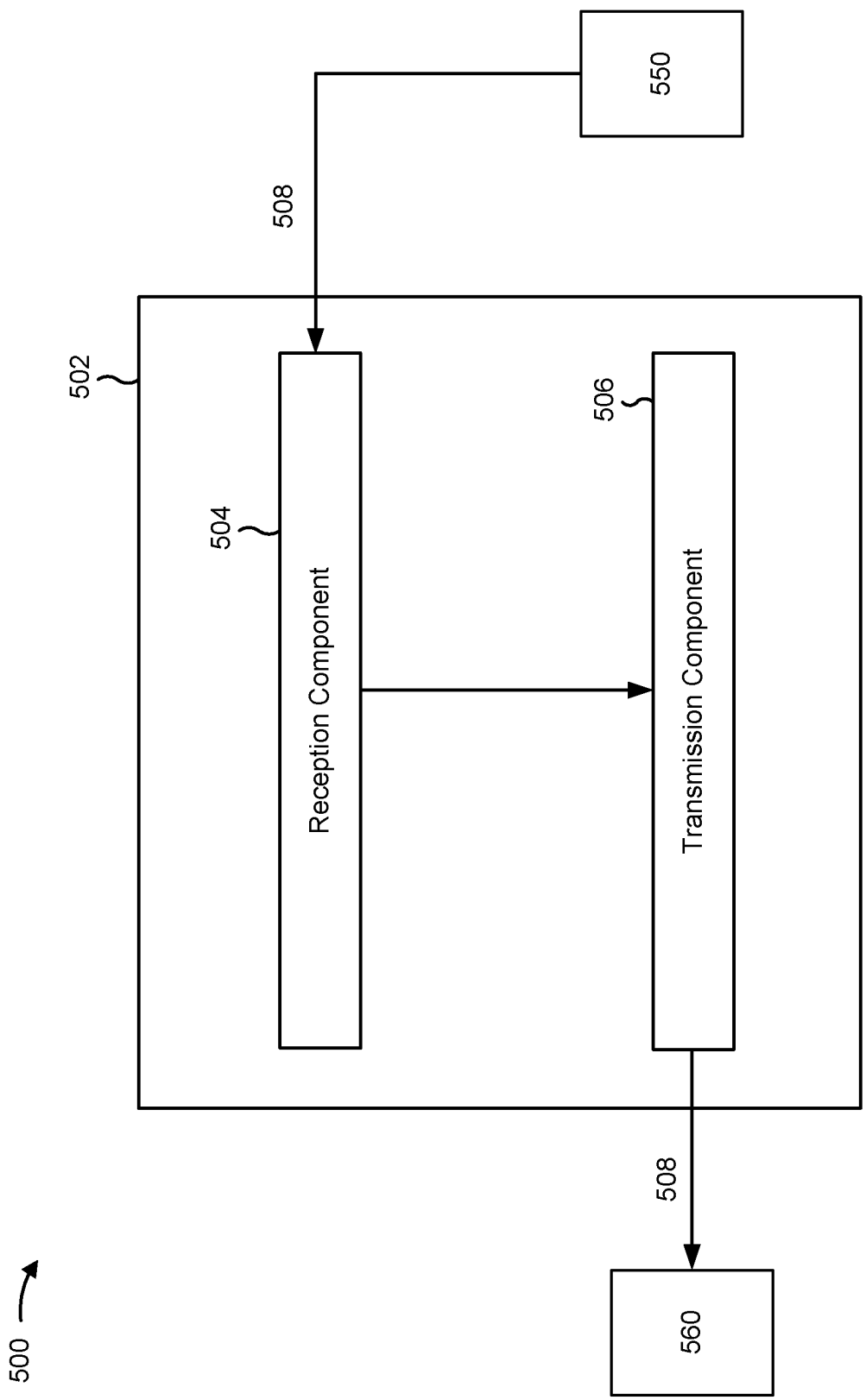
FIG. 5 is a conceptual data flow diagram illustrating the data flow between different components in an example apparatus, in accordance with various aspects of the present disclosure.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless communication device, comprising:
   receiving, on a sidelink and from a second wireless communication device, resource reservation information associated with the second wireless communication device,
      wherein the resource reservation information identifies sidelink resources that are reserved for the second wireless communication device for transmission on the sidelink, and
   transmitting, on the sidelink, the resource reservation information to a third wireless communication device in a second sidelink control information (SCI)-associated with a first SCI.

2. The method of claim 1, wherein transmitting the resource reservation information to the third wireless communication device comprises:
   transmitting the resource reservation information along with other resource reservation information associated with the first wireless communication device.

3. The method of claim 1, wherein transmitting the resource reservation information in the second SCI comprises:
   transmitting the resource reservation information in the second SCI on a physical sidelink shared channel (PSSCH).

4. The method of claim 1, further comprising:
   transmitting the resource reservation information to a fourth wireless communication device in a medium access control control element (MAC-CE) communication along with other shared data on a physical sidelink shared channel (PSSCH).

5. The method of claim 1, further comprising:
   transmitting the resource reservation information to a fourth wireless communication device in a medium access control control element (MAC-CE) communication on a physical sidelink shared channel (PSSCH) without other shared channel data.

6. The method of claim 1, further comprising:
   transmitting the resource reservation information to a fourth wireless communication device in part one of a two-part SCI communication on a physical sidelink control channel (PSCCH).

7. The method of claim 1, wherein the resource reservation information comprises at least one of:
   an indication of one or more frequency domain resources for transmission on the sidelink by the second wireless communication device,
   an indication of one or more time domain resources for transmission on the sidelink by the second wireless communication device,
   a source identifier associated with the second wireless communication device,
   a destination identifier associated with a destination wireless communication device for one or more sidelink communications to be transmitted on the sidelink by the second wireless communication device,
   a hybrid automatic repeat request identifier for the one or more sidelink communications,
   a zone identifier associated with the second wireless communication device,
   a zone identifier associated with the first wireless communication device, or
   a reference signal received power measurement for the second wireless communication device and generated by the first wireless communication device.

8. The method of claim 1, further comprising:
   receiving, on the sidelink and from one or more fourth wireless communication devices, other resource reservation information associated with the one or more fourth wireless communication devices; and
   wherein transmitting the resource reservation information to the third wireless communication device comprises:
      transmitting the resource reservation information along with the other resource reservation information to the third wireless communication device.

9. The method of claim 1, further comprising:
   transmitting the resource reservation information to one or more fourth wireless communication devices.

10. The method of claim 1, wherein the sidelink resources are autonomously reserved by the second wireless communication device.

11. The method of claim 1, wherein the sidelink resources are allocated to the second wireless communication device by a network entity.

12. The method of claim 1, wherein each of the first wireless communication device, the second wireless communication device, and the third wireless communication device is a user equipment or a road-side unit.

13. A first wireless communication device for wireless communication, comprising:
   a memory; and
   one or more processors coupled to the memory, the one or more processors configured to:
      receive, on a sidelink and from a second wireless communication device, resource reservation information associated with the second wireless communication device,
         wherein the resource reservation information identifies sidelink resources that are reserved for the second wireless communication device for transmission on the sidelink, and
      transmit, on the sidelink, the resource reservation information to a third wireless communication device in a second sidelink control information (SCI) associated with a first SCI.

14. The first wireless communication device of claim 13, wherein the one or more processors, when transmitting the resource reservation information to the third wireless communication device, are configured to:
   transmit the resource reservation information along with other resource reservation information associated with the first wireless communication device.

15. The first wireless communication device of claim 13, wherein the one or more processors, to transmit the resource reservation information in the second SCI, are configured to:
   transmit the resource reservation information in the second SCI on a physical sidelink shared channel (PSSCH).

16. The first wireless communication device of claim 13, wherein the one or more processors are further configured to:
   transmit the resource reservation information to a fourth wireless communication device in a medium access control control element (MAC-CE) communication along with other shared data on a physical sidelink shared channel (PSSCH).

17. The first wireless communication device of claim 13, wherein the one or more processors are further configured to:
   transmit the resource reservation information to a fourth wireless communication device in a medium access control control element (MAC-CE) communication on a physical sidelink shared channel (PSSCH) without other shared channel data.

18. The first wireless communication device of claim 13, wherein the one or more processors are further configured to:
transmit the resource reservation information to a fourth wireless communication device in part one of a two-part SCI communication on a physical sidelink control channel (PSCCH).

19. The first wireless communication device of claim 13, wherein the resource reservation information comprises at least one of:
an indication of one or more frequency domain resources for transmission on the sidelink by the second wireless communication device,
an indication of one or more time domain resources for transmission on the sidelink by the second wireless communication device,
a source identifier associated with the second wireless communication device,
a destination identifier associated with a destination wireless communication device for one or more sidelink communications to be transmitted on the sidelink by the second wireless communication device,
a hybrid automatic repeat request identifier for the one or more sidelink communications,
a zone identifier associated with the second wireless communication device,
a zone identifier associated with the first wireless communication device, or
a reference signal received power measurement for the second wireless communication device and generated by the first wireless communication device.

20. The first wireless communication device of claim 13, wherein the one or more processors are further configured to:
receive, on the sidelink and from one or more fourth wireless communication devices, other resource reservation information associated with the one or more fourth wireless communication devices; and
wherein the one or more processors, when transmitting the resource reservation information to the third wireless communication device, are configured to:
transmit the resource reservation information along with the other resource reservation information to the third wireless communication device.

21. The first wireless communication device of claim 13, wherein the one or more processors are further configured to:
transmit the resource reservation information to one or more fourth wireless communication devices.

22. The first wireless communication device of claim 13, wherein the sidelink resources are autonomously reserved by the second wireless communication device.

23. The first wireless communication device of claim 13, wherein the sidelink resources are allocated to the second wireless communication device by a network entity.

24. The first wireless communication device of claim 13, wherein each of the first wireless communication device, the second wireless communication device, and the third wireless communication device is a user equipment or a roadside unit.

25. A non-transitory computer-readable medium storing a set of instructions for wireless communication, the set of instructions comprising:
one or more instructions that, when executed by one or more processors of a first wireless communication device, cause the first wireless communication device to:
receive, on a sidelink and from a second wireless communication device, resource reservation information associated with the second wireless communication device,
wherein the resource reservation information identifies sidelink resources that are reserved for the second wireless communication device for transmission on the sidelink, and
transmit, on the sidelink, the resource reservation information to a third wireless communication device in a second sidelink control information (SCI) associated with a first SCI.

26. The non-transitory computer-readable medium of claim 25, wherein the one or more instructions, that cause the first wireless communication device to transmit the resource reservation information to the third wireless communication device, cause the first wireless communication device to:
transmit the resource reservation information along with other resource reservation information associated with the first wireless communication device.

27. The non-transitory computer-readable medium of claim 25, wherein the one or more instructions, that cause the first wireless communication device to transmit the resource reservation information in the second SCI, cause the first wireless communication device to:
transmit the resource reservation information in the second SCI on a physical sidelink shared channel (PSSCH).

28. A first apparatus for wireless communication, comprising:
means for receiving, on a sidelink and from a second apparatus, resource reservation information associated with the second apparatus,
wherein the resource reservation information identifies sidelink resources that are reserved for the second apparatus for transmission on the sidelink; and
means for transmitting, on the sidelink, the resource reservation information to a third apparatus in a second sidelink control information (SCI) associated with a first SCI.

29. The first apparatus of claim 28, wherein the means for transmitting the resource reservation information in the second SCI comprises:
means for transmitting the resource reservation information in the second SCI on a physical sidelink shared channel (PSSCH).

30. The first apparatus of claim 28, further comprising:
means for transmitting the resource reservation information to a fourth apparatus in part one of a two-part SCI communication on a physical sidelink control channel (PSCCH).

31. The first wireless communication device of claim 13, wherein the first SCI is transmitted on a physical sidelink control channel (PSCCH).

32. The first wireless communication device of claim 13, wherein the first SCI is part one of a two-part SCI communication.

33. The first wireless communication device of claim 32, wherein the second SCI is part two of the two-part SCI communication.

* * * * *